(12) United States Patent
Louis et al.

(10) Patent No.: US 12,297,321 B2
(45) Date of Patent: May 13, 2025

(54) POLY(ETHER KETONE KETONE) (PEKK) COMPOSITES

(71) Applicants: SOLVAY SPECIALTY POLYMERS USA, LLC, Alpharetta, GA (US); CYTEC INDUSTRIES INC., Princeton, NJ (US)

(72) Inventors: Chantal Louis, Alpharetta, GA (US); James Pratte, Wilmington, DE (US); Craig Swanson, Roswell, GA (US)

(73) Assignees: SOLVAY SPECIALTY POLYMERS USA, LLC, Alpharetta, GA (US); Cytec Industries Inc., Princeton, NJ (US)

(*) Notice: Subject to any disclaimer, the term of this patent is extended or adjusted under 35 U.S.C. 154(b) by 853 days.

(21) Appl. No.: 17/055,237

(22) PCT Filed: Jun. 17, 2019

(86) PCT No.: PCT/EP2019/065909
§ 371 (c)(1),
(2) Date: Nov. 13, 2020

(87) PCT Pub. No.: WO2019/243270
PCT Pub. Date: Dec. 26, 2019

(65) Prior Publication Data
US 2021/0253793 A1    Aug. 19, 2021

Related U.S. Application Data

(60) Provisional application No. 62/688,065, filed on Jun. 21, 2018.

(30) Foreign Application Priority Data

Jul. 17, 2018 (EP) .................. 18184039

(51) Int. Cl.
| | | |
|---|---|---|
| C08G 65/46 | (2006.01) | |
| C08G 61/12 | (2006.01) | |
| C08G 65/40 | (2006.01) | |
| C08K 3/04 | (2006.01) | |
| C08K 7/06 | (2006.01) | |
| C08K 7/14 | (2006.01) | |

(52) U.S. Cl.
CPC ........... *C08G 65/46* (2013.01); *C08G 61/127* (2013.01); *C08K 3/04* (2013.01); *C08K 7/06* (2013.01); *C08K 7/14* (2013.01); *C08G 65/4012* (2013.01); *C08G 2261/3442* (2013.01); *C08G 2261/71* (2013.01); *C08G 2650/40* (2013.01)

(58) Field of Classification Search
CPC .............. C08G 65/46; C08G 61/127; C08G 2261/3442; C08G 2261/71; C08G 2650/40; C08G 65/4012; C08K 3/04; C08K 7/06; C08K 7/14
See application file for complete search history.

(56) References Cited

U.S. PATENT DOCUMENTS

| | | | |
|---|---|---|---|
| 4,874,839 A | 10/1989 | Montoya et al. | |
| 5,137,608 A * | 8/1992 | Acar | C02F 3/34 |
| | | | 205/702 |
| 5,208,278 A | 5/1993 | Koch et al. | |
| 2017/0050390 A1 | 2/2017 | Kondou | |
| 2018/0208741 A1 | 7/2018 | France | |

FOREIGN PATENT DOCUMENTS

| | | |
|---|---|---|
| CN | 106008957 A | 10/2016 |
| DE | 4207555 A1 | 9/1993 |
| EP | 0298771 A2 | 1/1989 |
| EP | 1170318 A1 | 1/2002 |
| JP | S63159431 A | 7/1988 |
| SU | 445643 A1 | 10/1974 |
| WO | 2016031005 A1 | 3/2016 |
| WO | 2017013369 A1 | 1/2017 |
| WO | 2018115035 A1 | 6/2018 |

OTHER PUBLICATIONS

Machine English translation of DE 4207555, Wilharm et al., Sep. 1993.*
ASTM D3850-12—Standard Test Method for Rapid Thermal Degradation of Solid Electrical Insulating Materials By Thermogravimetric Method (TGA), 2012, p. 1-4.
ASTM D638-03—Standard Test Method for Tensile Propertiesof plastics, 2003, p. 1-15.
R. Guo et al., "Aromatic Polyethers, Polyetherketones, Polysulfides and Polysulfones", Polymer Science : A Comprehensive Reference, 2012, vol. 5, pp. 388-399.

* cited by examiner

*Primary Examiner* — Patrick D Niland
(74) *Attorney, Agent, or Firm* — Osha Bergman Watanabe & Burton LLP

(57) ABSTRACT

Poly(ether ketone ketone) (PEKK) composites include reinforcing fibers in a PEKK polymer matrix that includes a PEKK polymer. It was surprisingly discovered that by washing unneutralized PEKK polymer powder with an acid or base, the melt stability of the PEKK polymers can be improved, as compared with PEKK polymers prepared by conventional methods. The PEKK composites are especially well-suited for fabrication of thick composite parts where melt stability is especially important.

12 Claims, 1 Drawing Sheet

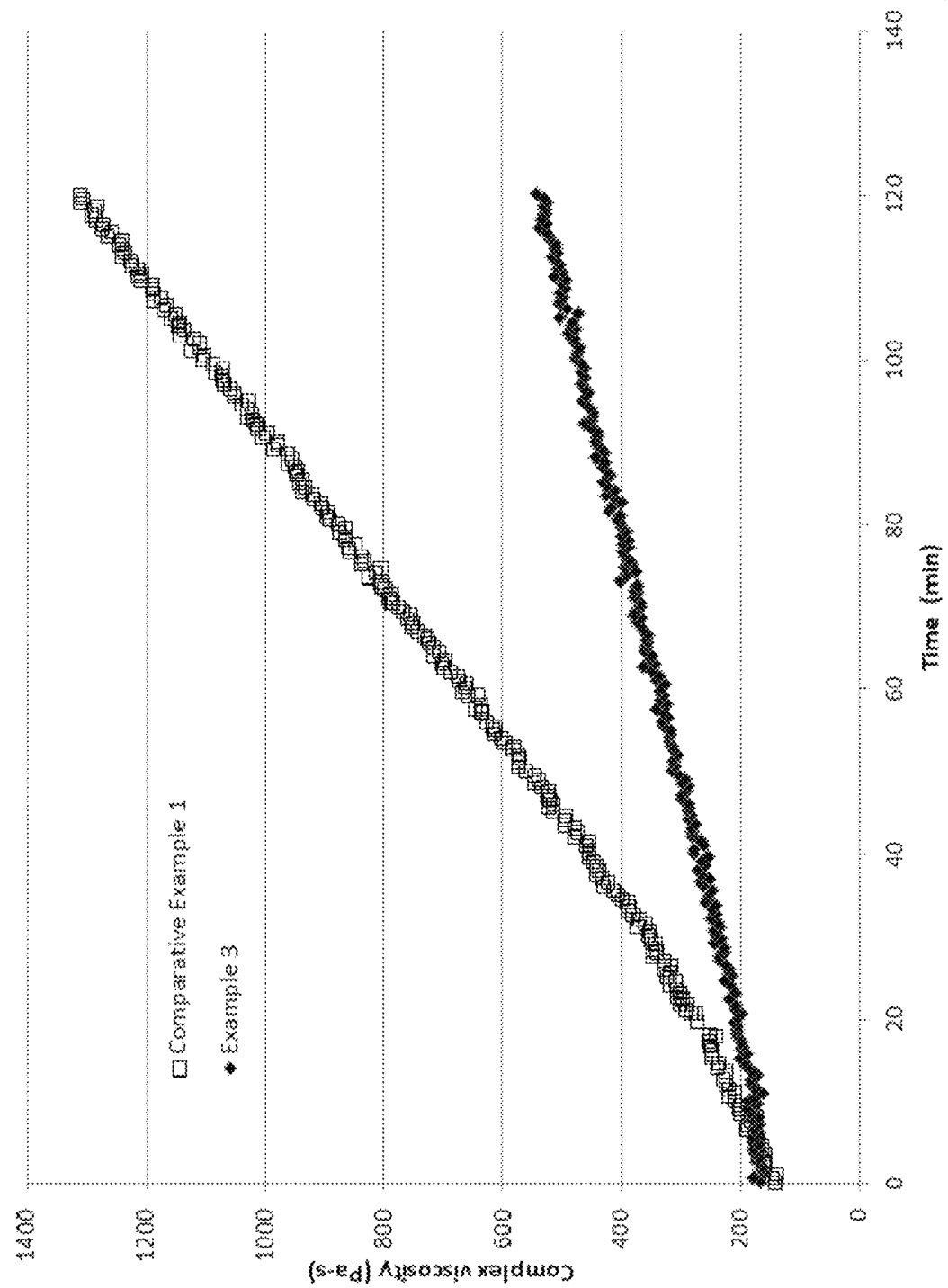

POLY(ETHER KETONE KETONE) (PEKK) COMPOSITES

RELATED APPLICATIONS

This application is a U.S. national stage entry under 35 U.S.C. § 371 of International Application No. PCT/EP2019/065909, filed Jun. 17, 2019, which claims priority to U.S. provisional patent application No. 62/688,065, filed on Jun. 21, 2018, and to European patent application No. 18184039.8, filed on Jul. 17, 2018, the whole content of each of these applications being incorporated herein by reference for all purposes.

FIELD OF THE INVENTION

The invention relates to methods of improving the melt stability of PEKK polymers, poly(ether ketone ketone) (PEKK) composites, and composite articles including the PEKK composites.

BACKGROUND OF THE INVENTION

Poly(ether ketone ketone) (PEKK) polymers are well-suited for use in relatively extreme conditions. In part, due to the high crystallinity and high melt temperature of PEKK polymers, they have excellent thermal, physical, and mechanical properties, and are well-suited for use as a polymer matrix for continuous fiber reinforced composites. Such PEKK composites are used in a wide range of demanding application settings including, but not limited to, aerospace applications.

Nevertheless, it is not currently possible, without compromising toughness, to make thick PEKK composites (e.g. 60-ply or greater) without the use of large and expensive equipment such as an industrial-size autoclave to fuse multiple layers of the composite together simultaneously, and thereby limit the exposure of the molten resin to long residence times at high temperatures. Composites can be fabricated, for example, with simpler and more cost effective VBO (Vacuum Bag Only) technology, where layers of composite are applied sequentially to form the final composite article; however, this technology requires long residence times at elevated temperatures. Areas of poor consolidation, degradation, or porosity may result when thick PEKK composites are made in this way if the polymer matrix lacks sufficient melt stability.

Solutions have been proposed to stabilize poly(aryl ether ketone) (PAEK) polymers, which includes PEKK polymers, but these solutions have not been entirely satisfactory.

U.S. Pat. No. 5,208,278 describes the use of organic bases as a stabilizing additive; however, the organic bases can evaporate or generate volatile organic compounds from the PAEK polymers at processing temperatures.

International Published Application No. WO2017/013369A1 discloses stabilizing PAEK composites, such as PEKK composites, by dry blending, impregnating or compounding PAEK polymers with a phosphate salt or a mixture of phosphate salts. These methods have disadvantages such as lack of homogenous distribution of the phosphate salts in the polymer, for example when processed to make a composite.

Finally, U.S. Pat. No. 4,874,839 exemplifies melt-stabilizing a PAEK polymer by adding sodium dihydrogen phosphate solution to the PAEK polymer, which was pretreated at a high temperature in an autoclave and then heated to 300° C. for 3 hours to impregnate the phosphate. The high temperatures and pressures required by this method are industrially difficult and costly to operate. Furthermore, the high temperature pretreatment of the polymer tends to make it less porous and more difficult to stabilize with the phosphate salt.

Accordingly, a need exists for PEKK polymers having improved melt stability and that are suitable for manufacture of thick composites using cost-effective technologies.

BRIEF DESCRIPTION OF THE FIGURES

FIG. 1 is a plot illustrating the viscosity profile by parallel plates over time of the PEKK polymer of Comparative Example 1 and the PEKK polymer of Example 3.

DETAILED DESCRIPTION OF THE INVENTION

Exemplary embodiments are directed to methods of improving the melt stability of poly(ether ketone ketone) (PEKK) polymers, as well as to poly(ether ketone ketone) (PEKK) composites including the PEKK polymers, and composite articles including the PEKK composites. The PEKK composites include reinforcing fibers in a polymer matrix including a PEKK polymer.

It was surprisingly discovered that by washing unneutralized PEKK polymer powder with an acid or base, the melt stability of the PEKK polymers can be improved, as compared with PEKK polymers prepared by conventional methods. Indeed, PEKK composites including the neutralized PEKK polymers described herein are especially well-suited for fabrication of thick composite articles (i.e. articles at least a portion of which is 4 mm or greater in thickness). Furthermore, because of the increased melt stability of the polymer matrices of the inventive PEKK composites, the PEKK composites can be manufactured into thick composite articles by more cost-effective VBO technology.

Methods of Increasing the Melt Stability of a PEKK Polymer

Thus, exemplary embodiments are directed to methods of increasing the melt stability of an unneutralized PEKK polymer, the method including washing an unneutralized PEKK polymer powder with a solution including an acid or base in an amount sufficient to neutralize the PEKK polymer.

As used herein, a "neutralized PEKK polymer" means a PEKK polymer having a residual acidity ≤10 µeq/g and a residual basicity ≤−24 µeq/g, where the residual acidity is determined by the Residual Acidity Test and the residual basicity is determined by the Residual Basicity Test. As used herein, the "Residual Acidity Test" and "Residual Basicity Test" refer to the titration analyses in m-cresol described in the Examples below. Conversely, an "unneutralized PEKK polymer" means a PEKK polymer having a residual acidity >10 µeq/g or a residual basicity >−24 µeq/g, where the residual acidity is determined by the Residual Acidity Test and the residual basicity is determine by the Residual Basicity Test. The action, "to neutralize a PEKK polymer" as used herein means to convert an unneutralized PEKK polymer into a neutralized PEKK polymer.

As used herein, "washing" a PEKK polymer with a solution including an acid or base means contacting the PEKK polymer with the acid or base in solution and then substantially removing the acid or base solution from contact with the PEKK polymer. "Substantially removing" means that less than 30 wt. % of the acid or base, based on the total weight of the acid or base and the PEKK polymer, remains in contact with the PEKK polymer following the wash. In some embodiments, the PEKK polymer is contacted with the acid or base for a time ranging from 5 minutes to 5 hours, preferably from 10 minutes to 3 hours. Methods of washing polymers are well known to those of skill in the art, and include, for example, slurrying the polymer with the solution including the acid or base, and then filtering off the solution.

It should be noted that "washing" is distinct from "impregnation" or the like, where a polymer may be contacted with a solution and then the solvent removed to leave the solute in contact with the polymer. Similarly, "washing" is different from adding a stabilizer to the PEKK polymer, where the stabilizer remains in contact with the polymer indefinitely. Advantages of washing include, ease, reduced cost, and avoidance of possible undesirable effects of leaving acids or bases in contact with (or dispersed within) the PEKK polymers. Finally, "washing" is also distinct from hydrothermal treatments involving high temperatures (i.e. greater than 100° C.) or high pressures (i.e. greater than 80 psig). In this regard, the washing is preferably performed at atmospheric pressure or at pressure of at most 80 psig. The washing is preferably carried out at a temperature ranging from 0 to 100° C.

Although the time at which the washing is performed is not particularly limited, preferably the washing is performed as part of the overall polymer synthesis, preferably as a final step in the synthesis of the PEKK polymer.

The concentration of the acid or base in the solution is also not particularly limited, but should be sufficient to neutralize the residual acidity or residual basicity of the PEKK polymer. The amount of acid or base in the solution is preferably is matched to the amount of acidity or basicity to be neutralized. Thus, in some embodiments, the residual acidity or residual basicity of the PEKK polymer is measured with the Residual Acidity Test or Residual Basicity Test prior to the washing of the PEKK polymer with the solution including the acid or base, and the measured residual acidity or residual basicity is used to determine an amount of acid or base that is proportional to the residual acidity or basicity to be neutralized.

In some embodiments, the washing consists of a single washing step; however, it should be understood that the washing can also include a combination of more than one washing step, for example, with different acids, bases, or solvents in each step, provided that the combination of the washing steps achieves the result of neutralizing the PEKK polymer.

Suitable acids and bases include any organic or inorganic acid or base that exhibits a solubility of at least 0.1 wt. % in organic solvents such as alcohols, ketones, amides, aromatic hydrocarbons or in water at temperatures below the boiling point of the solvent. Preferably, the solvent has a boiling point of at most 250° C., more preferably at most 150° C. and most preferably at most 100° C. The acids preferably have a pKa ranging from 3.0 to 7.5, and the bases preferably have a pKb ranging from −1.0 to 8.0.

In some embodiments, the acid is selected from acetic acid, mono alkali metal citrates, alkali or alkaline earth metal dihydrogenphosphates, and combinations thereof. Preferably, the acid is alkali or alkaline earth metal dihydrogenphosphate, preferably alkali metal dihydrogenphosphate, more preferably sodium or potassium dihydrogenphosphate. These acids can be used in their anhydrous form as solutions or as hydrates such as sodium dihydrogenphosphate dehydrate $NaH_2PO_4 \cdot 2H_2O$.

In some embodiments, the base is selected from organic amines, tetraalkylammonium hydroxide, tetraalkylammonium acetate, tetraalkylphosphonium hydroxide, tetraalkylphosphonium acetate, alkali or alkaline earth metal hydroxides, alkali or alkaline earth metal monohydrogenphosphates, alkali or alkaline earth metal phosphates, and combinations thereof.

The preferred solvent is water, alcohol, ether, or ketones with boiling point of at most 150° C.; however, any solvent capable of dissolving at least 0.1 wt. % of the acid or base, and which does not adversely react with the PEKK polymer, may be used. Preferably the solvent is water, methanol, ethanol, propanol, or isopropanol. More preferably the solvent is water, methanol, or ethanol. In some embodiments, more than one solvent can be used.

The PEKK polymer is washed in the form of a powder. To ensure optimal contact with the washing solution, the mean particle size of the PEKK polymer during the washing preferably ranges from 50 µm to 2 mm, more preferably from 200 µm to 1 mm. The PEKK polymer powder may have a BET surface area greater than 0.5 m2/g, preferably greater than 1.0 m²/g, most preferably greater than 2.5 m²/g as measured by ISO 9277 with a soak temperature of 25° C.

Polymer Matrix

The polymer matrix includes a PEKK polymer, neutralized by the methods described herein, and optionally one or more additives as described below. The polymer matrix can be prepared by methods well-known in the art. Such methods include, but are not limited to, dry-blending of the PEKK polymer and any additional ingredients to form a powder.

Poly(Ether Ether Ketone) (PEKK) Polymers

The PEKK polymers of interest herein contain at least one recurring unit ($R^M_{PEKK}$) and at least one recurring unit ($R^P_{PEKK}$). Each recurring unit ($R^M_{PEKK}$) is represented by a formula according to the general formula:

-[-$M_m$-O-]-, and (1)

each recurring unit ($R^P_{PEKK}$) is represented by a formula according to the following general formula:

-[-$M_p$-O-]-, (2)

where $M_m$ and $M_p$ are represented by the following general formulae, respectively:

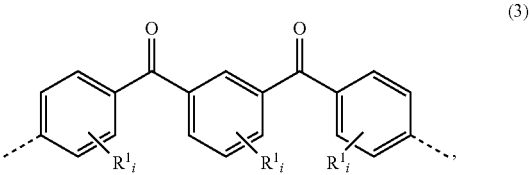

(3)

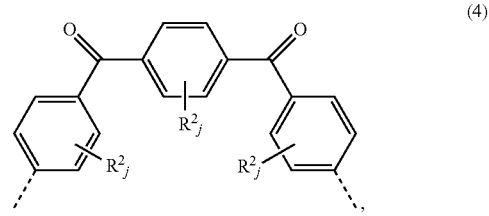

(4)

In Formulae (3) and (4), $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4. As used herein, a dashed bond indicates a bond to an atom outside of the drawn structure. The subscripts "p" and "m" on the species "M" reflect the respective para (Formulae (4)) and meta (Formula (3)) benzoyl substitutions on the central benzene ring. In some embodiments, each i and j are zero. For clarity, in some embodiments, the PEKK polymer has a plurality of recurring units ($R^M_{PEKK}$), a plurality of recurring units ($R^P_{PEKK}$), or both, with each recurring unit being distinct. Accordingly, reference to recurring units ($R^M_{PEEK}$) references all types of recurring units in PEKK according to general Formula (1) and reference to recurring units ($R^P_{PEKK}$) references all types of recurring units in PEKK according to general Formula (2).

As used herein, a PEKK polymer refers to any polymer in which the total concentration of recurring units ($R^m_{PEKK}$) and recurring units ($R^P_{PEKK}$) is at least 50 mol %, relative to the total number of moles of recurring unit in the PEKK polymer. In some embodiments, the total concentration of recurring units ($R^m_{PEKK}$) and recurring units ($R^P_{PEKK}$) is at least 60 mol %, at least 70 mol %, at least 80 mol %, at least 90 mol %, at least 95 mol % or at least 99 mol %, relative to the total number of moles of recurring units in the PEKK polymer. In some embodiments, the ratio of the total number of moles of recurring units ($R^P_{PEKK}$) to the total number of moles of recurring units ($R^m_{PEKK}$) ("($R^P_{PEKK}$)/($R^M_{PEKK}$) ratio" or "T/I ratio") ranges from 55/45 to 75/25, preferably from 60/40 to 80/20, more preferably from 62/38 to 75/25.

In some embodiments, recurring units ($R^M_{PEKK}$) include a recurring unit ($R^{M1}_{PEKK}$) and recurring ($R^P_{PEKK}$) includes recurring units ($R^{P1}_{PEKK}$), ($R^{P2}_{PEKK}$), and ($R^{P3}_{PEKK}$). Recurring units ($R^{M1}_{PEKK}$), ($R^{P1}_{PEKK}$), ($R^{P2}_{PEKK}$) and ($R^{P3}_{PEKK}$) are Represented by the Following Formulae, Respectively:

-[-$M^{1*}_m$-O—]-,  (5)

-[-$M^{1*}_p$-O—]-,  (6)

-[-$M^{2*}_p$-O—]-,  (7)

-[-$M^{3*}_p$-O—]-, and  (8)

where $M^{1*}_m$, $M^{1*}_p$, $M^{2*}_p$, and $M^{3*}_p$ are represented by the following formulae, respectively:

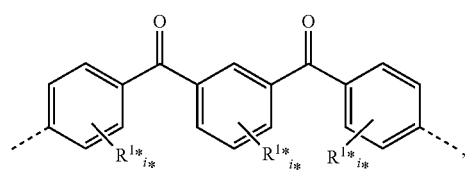

(9)

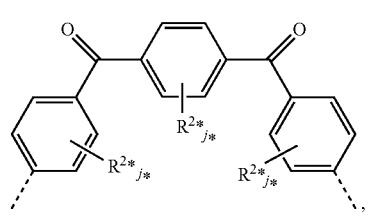

(10)

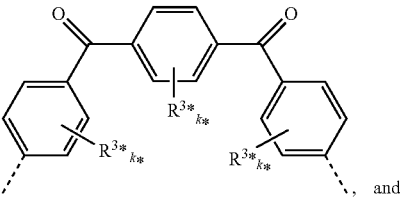

(11)

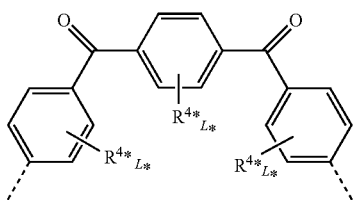

(12)

where $R^{1*}$, $R^{2*}$, $R^{3*}$ and $R^{4*}$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i*, j*, k* and L*, at each instance, is an independently selected integer ranging from 0 to 4. In some embodiments, each i*, j*, k* and L* is zero. In some embodiments, the total concentration of recurring unit ($R^{M1}_{PEKK}$) and recurring units ($R^{P1}_{PEKK}$), ($R^{P2}_{PEKK}$) and ($R^{P3}_{PEKK}$), is at least 50 mol %, at least 60 mol %, at least 70 mol %, at least 80 mol %, at least 90 mol %, at least 95 mol % or at least 99 mol %, or 100 mol %, relative to the total number of moles of recurring units ($R^M_{PEKK}$) and recurring units ($R^P_{PEKK}$). In some embodiments, ratio of the total number of moles of recurring units ($R^{P1}_{PEKK}$), ($R^{P2}_{PEKK}$), and ($R^{P3}_{PEKK}$) to the number of moles of recurring unit ($R^{M1}_{PEKK}$) is within the ranges above described with respect to recurring units ($R^M_{PEKK}$) and ($R^P_{PEKK}$).

As noted above, the PEKK polymers of interest unexpectedly exhibit improved melt stability as compared with PEKK polymers made by conventional methods. Thus, in some embodiments, the PEKK polymer exhibits a complex viscosity ratio 120/10 (parallel plates) as measured according to ASTM D4440 at 410° C., under nitrogen, 10 rad/s, 1% strain at 10 and 120 minutes, ranging from 1.0 to 3.5, preferably ranging from 1.0 to 3.2.

The PEKK polymer typically exhibits a melt flow as measured by ASTM D1238 at 360° C./8.4 kg weight (as detailed in the examples) of 10 to 150 g/10 min, preferably from 50 to 120 g/10 min.

In some embodiments, the PEKK polymer represents at least 80 wt. %, preferably at least 85 wt. %, 90 wt. %, 95 wt. %, 98 wt. %, 99 wt. %, of the polymer matrix.

In some embodiments, the PEKK polymers are synthesized via an electrophilic (Friedel-Crafts) polycondensation. Synthesis of PEKK polymers by electrophilic substitution is well-known in the art and is described, for example, in *Aromatic Polyethers, Polyetherketones, Polysulfides and Polysulfones*" R. Guo, J. McGrath in Polymer Science: A Comprehensive Reference, 2012, vol, 5, pp. 388-399, which is incorporated herein by reference in its entirety.

Optional Additional Ingredients in the Polymer Matrix

In some embodiments, the polymer matrix can include one or more additional ingredients selected from the group consisting of (i) colorants (e.g. a dye); (ii) pigments (e.g., titanium dioxide, zinc sulfide and zinc oxide); (iii) light stabilizers (e.g. UV stabilizers); (iv) heat stabilizers; (v) antioxidants (e.g. organic phosphites and phosphonites); (vi) acid scavengers (vii) processing aids (viii) nucleating agents (ix) plasticizer, internal lubricants, and external lubricants; (x) flame retardants (xi) smoke-suppressing agents (x) anti-static agents (xi) anti-blocking agents (xii) conductivity additives (e.g. carbon black and carbon nanofibrils) (xiii) plasticizers; (xiv) flow modifiers; (xv) extenders; (xvi) metal deactivators and any combination of one or more thereof. Preferably, the total concentration of additional ingredients is less than 20%, preferably less than 10%, more preferably less than 5% and even more preferably less than 2%, based upon the total weight of the polymer matrix.

Reinforcing Fibers

The reinforcing fibers may be organic or inorganic. Suitable fibers for use as the reinforcing fiber component include, for example, carbon fibers, graphite fibers, glass fibers, such as E glass fibers, ceramic fibers, such as silicon carbide fibers, synthetic polymer fibers, such as aromatic polyamide fibers, polyimide fibers and polybenzoxazole fibers. The areal weight of a single layer or cross section of such fibers can vary, for example, from 50 to 600 g/m$^2$.

In some embodiments, the fibers comprise carbon fibers, glass fibers, or both carbon fibers and glass fibers. In some embodiments, the fibers comprise carbon fibers, including, for example, carbon fibers that exhibit a tensile strength of greater than or equal to 3.5 GigaPascals ("GPa") and a tensile modulus of greater than or equal to 200 GPa, as measured by ASTM D638.

The fibers may be in the form of whiskers, short fibers, continuous fibers, sheets, plies, and combinations thereof. Continuous fibers may further adopt any of unidirectional, multi-dimensional, non-woven, woven, knitted, stitched, wound, and braided configurations, as well as swirl mat, felt mat, and chopped mat structures. The fiber tows may be held in position in such configurations by cross-tow stitches, weft-insertion knitting stitches, or a small amount of resin, such as a sizing. As used herein "continuous fibers" are fibers having a length greater than 10 mm.

Method of Making the PEKK Composite

Exemplary embodiments are directed to methods of making PEKK composites comprising impregnating the reinforcing fibers described above with the polymer matrix described herein.

Various methods can be employed by which fibers may be impregnated with the polymer matrix, wherein the matrix is either in molten or particulate form, including, for example, powder coating, film lamination, extrusion, pultrusion, aqueous slurry, and melt impregnation, to form plies in the form of, for example, sheets or tapes of fibers that are at least partially impregnated with matrix material. As used herein, "tape" means a strip of material with longitudinally extending reinforcement fibers that are aligned along a single axis of the strip material.

Plies of matrix impregnated fibers may be placed adjacent one another to form an unconsolidated composite laminate, such as a prepreg. The fiber reinforced layers of the laminate may be positioned with their respective fiber reinforcements in selected orientations relative to one another.

The plies may be stacked, manually or automatically, e.g., by automated tape layup using "pick and place" robotics, or advanced fiber placement wherein pre-impregnated tows of fibers are heated and compacted in a mold or on a mandrel, to form a composite laminate having desired physical dimensions and fiber orientations.

The layers of an unconsolidated laminate are typically not completely fused together and the unconsolidated composite laminate may exhibit a significant void content, e.g., greater than 20% by volume as measured by x-ray microtomography. Heat and/or pressure may be applied, or sonic vibration welding may be used, to stabilize the laminate and prevent the layers from moving relative to one another, e.g., to form a composite material "blank", as an intermediate step to allow handling of the composite laminate prior to consolidation of the composite laminate.

The composite laminate so formed is subsequently consolidated, typically by subjecting the composite laminate to heat and pressure, e.g., in a mold, to form a shaped fiber reinforced thermoplastic matrix composite article. As used herein, "consolidation" is a process by which the matrix material is softened, the layers of the composite laminate are pressed together, air, moisture, solvents, and other volatiles are pressed out of the laminate, and the adjacent plies of the composite laminate are fused together to form a solid, coherent article. Ideally, the consolidated composite article exhibits minimal, e.g., less than 5% by volume, more typically less than 2% by volume, void content as measured by x-ray microtomography.

The PEKK composite preferably comprises from 20 to 80 wt. % of reinforcing fibers and from 80 to 20 wt. % of the polymer matrix by weight of the PEKK composite.

Composite Articles

The PEKK composites described herein can be incorporated into composite articles, including, but not limited to, components for aerospace applications.

In some embodiments, the composite articles are in the form of substantially bidimensional articles. Bidimensional articles include parts in which one dimension (thickness or height) is significantly less than the other two characterizing dimensions (length and width), for example, films and sheets. In some embodiments, the composite articles are three-dimensional parts. Three-dimensional parts include parts that substantially extend in the three dimensions of space in similar manner, including in the form of parts with complex geometries (e.g., concave or convex sections, possibly including undercuts, inserts, and the like).

In some embodiments, the composite article includes at least one portion having a thickness of at least 4 mm.

Due at least in part to the unexpectedly improved melt stability of the polymer matrix a composite article including the polymer matrix may exhibit less than 2% voids by volume in portions having a thickness greater than 5 mm, where the percent voids is determined by x-ray microtomography.

In some embodiments, the toughness of the PEKK composite exceeds 75% of its initial toughness after being heated at a temperature ranging from 290° C. to 370° C. for 20 minutes, where toughness is measured as compression strength after impact using 1500 in-lbs/in impact energy per ASTM test method D7137/7136.

In some embodiments, the toughness of the PEKK composite exceeds 75% of its initial toughness after being heated at a temperature ranging from 290° C. to 370° C. for 20 minutes, where toughness is measured as mode 1 fracture toughness per ASTM 5228.

Exemplary embodiments are also directed to a PEKK composite comprising the polymer matrix and the reinforcing fibers as described herein, wherein the PEKK polymer of the composite includes greater than 30 wt·ppm of aluminum and greater than 200 wt·ppm of phosphorus as determined by ICP-OES, and has a thermal stability (Td 2%) of at least 495° C. as measured by thermal gravimetric analysis according to ASTM D3850 from 30° C. to 800° C. under nitrogen (60 mL/min) at 10° C./minute.

EXAMPLES

The following examples demonstrate the synthesis of PEKK and its thermal, rheological, and chemical properties.

Raw Materials 1,4-Bis(4-phenoxybenzoyl)benzene was prepared according to Russian Published Application No. SU445643 A1 (incorporated herein by reference).

1,2-dichlorobenzene, terephthaloyl chloride, isophthaloyl chloride, 3,5-dichlorobenzoylchloride, aluminum chloride ($AlCl_3$), methanol were purchased from Sigma Aldrich.

Lithium chloride (anhydrous powder) was procured from Acros.

Magnesium oxide, Kyowamag® MF-150, was procured from Kyowa Chemical Industry Co., Ltd., Japan.

Tetrabutylammonium hydroxide, $NaH_2PO_4 \cdot 2H_2O$, and $Na_2HPO_4$ were purchased from Sigma-Aldrich.

Tetramethylammonium acetate was purchased from Ark Pharma.

Methanol, m-cresol, 99%, chloroform, and formaldehyde solution were obtained from Sigma-Aldrich.

Determination of Melt Flow Index

The melt flow index was determined according to ASTM D1238 at 360° C. with a 3.8 kg weight. The final MFI for a 8.4 kg weight was obtained by multiplying the value obtained by 2.35.

Determination of Thermal Stability (Temperature for 2% Weight Loss)

The temperature for 2% weight loss (Td 2%) was measured by thermal gravimetric analysis ("TGA") according to ASTM D3850. TGA was performed on a TA Instruments TGA Q500 from 30° C. to 800° C. under nitrogen (60 mL/min) at 10° C./minute.

Determination of Glass Transition Temperature (Tg), Melting Temperature (Tm) and Crystallization Temperature (Tc)

The glass transition temperature (Tg) (mid-point), melting temperature (Tm), and crystallization temperature (Tc) were determined on the second heat scan in a differential scanning calorimeter (DSC) according to ASTM D3418-03, E1356-03, and E794-06. A TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:

1st heat cycle: 30.00° C. to 400.00° C. at 10.00° C./min, isothermal at 400.00° C. for 1 min;

1st cool cycle: 400.00° C. to 30.00° C. at 10.00° C./min, isothermal for 1 min; and 2nd heat cycle: 30.00° C. to 400.00° C. at 10.00° C./min, isothermal at 400.00° C. for 1 min.

The melting temperature Tm was determined as the peak temperature of the melting endotherm on the second heat scan. The crystallization temperature (Tc) was determined as the peak temperature of the crystallization exotherm on the first cool scan.

Determination of Melt Stability by Parallel Plates (VR120)

A 7.62 cm diameter×3 mm plaque was prepared by compression molding under the following conditions:
1. preheat at 368° C.,
2. 368° C./15 minutes, 2000 kg-f
3. 368° C./2 minutes, 2700 kg-f
4. cool down to 30° C. over 40 minutes, 2000 kg-f.

A 25 mm-diameter disk was drilled out of the plaque and analyzed by parallel plates rheology according to ASTM D4440 on a TA ARES RDA3 rheometer. The complex viscosity was measured at 410° C., under nitrogen, 10 rad/s, 1% strain over a period of 120 minutes.

Determination of Elemental Impurities in Monomers and Polymer by ICP-OES Method

A clean, dry platinum crucible was placed onto an analytical balance, and the balance was zeroed. One half to three grams of monomer/polymer sample was weighed into a boat and its weight was recorded to 0.0001 g. The crucible with sample was placed in a muffle furnace (Thermo Scientific Thermolyne F6000 Programmable Furnace). The furnace was gradually heated to 525° C. and held at that temperature for 10 hours to dry ash the sample. Following ashing, the furnace was cooled down to room temperature, and the crucible was taken out of the furnace and placed in a fume hood. The ash was dissolved in diluted hydrochloric acid. The solution was transferred to a 25 mL volumetric flask, using a polyethylene pipette. The crucible was rinsed twice with approximately 5 mL of ultrapure water (R<18 MΩcm) and the washes were added to a volumetric flask to effect a quantitative transfer. Ultrapure water was added to total 25 mL in the flask. A stopper was put on the top of the flask and the contents were shaken well to mix.

ICP-OES analysis was performed using an inductively-coupled plasma emission spectrometer Perkin-Elmer Optima 8300 dual view. The spectrometer was calibrated using a set of NIST traceable multi-element mixed standards with analyte concentrations between 0.0 and 10.0 mg/L. A linear calibration curve was obtained in a range of concentrations with a correlation coefficient better than 0.9999 for each of 48 analytes. The standards were run before and after every ten samples to ensure instrument stability. The results were reported as an average of three replicates. The concentration of elemental impurities in the sample was calculated with the following equation:

$$A=(B*C)/(D)$$

where:

A=concentration of element in the sample in mg/kg (=wt·ppm)

B=element in the solution analyzed by ICP-OES in mg/L

C=volume of the solution analyzed by ICP-OES in mL

D=sample weight in grams used in the procedure.

Determination of Residual Acidity (the "Residual Acidity Test")

0.15-0.20 g of PEKK sample was weighted into a titration vessel and dissolved in 8 mL of m-cresol. After dissolving, the sample was diluted with 8 mL of chloroform, 50 µL of 37 wt/vol % aqueous formaldehyde solution. The sample was then titrated potentiometrically with standard 0.1N KOH in methanol using a Metrohm autotitrator Titrando 809 with an 2 mL burette and Metrohm combined pH electrode (Solvotrode) with flexible ground joint diaphragm, filled with 3M LiCl in ethanol. The titrator readings were plotted against the volume of titrant solution, and the end point was taken at the inflection in the titration curve. Blank solutions were run every time samples were run, and under the same conditions. The blank value was determined from the volume of titrant needed to achieve the same mV electrode potential as the sample titration endpoint potential.

Variables:
V_blank—average volume of titrant to reach equivalence points from blanks, in mL
V_sample—volume of titrant to reach equivalence points in from a sample, in mL
W—sample mass in grams
N—titrant normality Residual Acidity Equation:

$$\frac{(V\_\text{sample} - V\_\text{blank}) \times N \times 1000}{W} = \text{Residual acidity in } \frac{\mu eq}{g}$$

Determination of Residual Basicity (the "Residual Basicity Test")

0.10-0.15 g of PEKK sample was weighted into a titration vessel and dissolved in 24 mL of titration solvent (m-cresol). The sample was then titrated potentiometrically with standard 0.1N perchloric acid in glacial acetic acid using a Metrohm autotitrator Titrando 809 with 10 mL burette and a Metrohm combined pH electrode (Solvotrode) with flexible ground-joint diaphragm, filled with 3M LiCl in ethanol. The titrator readings were plotted against the volume of titrant solution, and the end point was taken at the inflection in the titration curve. Each sample (including a blank solution) was run in duplicate and the average of the two results was reported.

Variables:
V_blank—average volume of titrant to reach equivalence points from blanks, in mL
V_sample—volume of titrant to reach equivalence points from a sample, in mL
W—sample mass in grams
N—titrant normality Residual Basicity Equation:

$$\frac{(V\_\text{sample} - V\_\text{blank}) \times N \times 1000}{W} = \text{Residual basicity in } \frac{\mu eq}{g}$$

Comparative Example 1: PEKK Polymer with High Residual Acidity Impregnated with $NaH_2PO_4 \cdot 2H_2O/Na_2HPO_4$ Polycondensation In a 2000 mL 4-neck reaction flask fitted with a stirrer, a dry $N_2$ inlet tube, a thermocouple plunging in the reaction medium, and a condenser were introduced 1000 g 1,2-dichlorobenzene and 40.63 g 1,4-Bis(4-phenoxybenzoyl) benzene. Under a sweep of dry nitrogen, 7.539 g of terephthaloyl chloride, 9.716 g of isophthaloyl chloride and 0.238 g of benzoyl chloride were then added to the reaction mixture. The reactor was then cooled to −5° C. and 71.88 g of aluminum chloride ($AlCl_3$) were added slowly while keeping the temperature below 5° C. The reaction was held at 5° C. for 10 minutes then the temperature of the mixture was increased to 90° C. at 5° C./minute. The reaction mixture was held at 90° C. for 30 minutes then cooled down to 30° C. At 30° C., 250 g of methanol were added slowly to maintain the temperature below 60° C. After the end of the addition, the reaction mixture was kept under agitation for 2 hours then cooled down to 30° C.

Filtration and Washing

The solid was then removed by filtration on a Büchner. The wet cake was rinsed on the filter with an additional 188 g of methanol. The wet cake was then reslurried in a beaker with 440 g of methanol for 2 hours. The polymer solid was filtered again on Büchner funnel and the wet cake was rinsed on the filter with 188 g of methanol. The solid was slurried with 470 g of an aqueous hydrochloric acid solution (3.5 wt %) for 2 hours. The solid was then removed by filtration on a Büchner. The wet cake was rinsed on the filter with an additional 280 g of water. The wet cake was then reslurried in a beaker with 250 g of 0.5N sodium hydroxide aqueous solution for 2 hours. The wet cake was then reslurried in a beaker with 475 g of water and filtered on Büchner funnel. The last water washing step was repeated 3 more times. The polymer was then slurried with 0.60 g of an aqueous solution containing 6.6 wt. % of $NaH_2PO_4 \cdot 2H_2O$ and 3.3 wt. % of Na2HPO4, by total weight of the solution, then dried in a vacuum oven at 180° C. for 12 hours.

The resulting polymer powder was and analyzed for metals, acidity, and basicity as described below in Table 1.

Comparative Example 2: PEKK Polymer with High Basicity Dry-Blended with MgO 49.75 g the polymer powder from Comparative Example 1 was mixed with 0.25 g of magnesium oxide in a high shear mixer.

Example 3: PEKK Polymer Washed with Tetramethylammonium Acetate and $NaH_2PO_4 \cdot 2H_2O/Na_2HPO_4$ In a 3000 mL 3-neck reaction flask fitted with a stirrer, a dry $N_2$ inlet tube, a thermocouple plunging in the reaction medium, and a condenser were introduced 50 g of polymer powder prepared according to Example 1, 0.665 g of tetramethylammonium acetate and 500 g of methanol. The mixture was held at 55° C. under agitation for 2 hours, then the solid was filtered on Büchner funnel. The solid was reintroduced in the reaction flask with 800 g methanol and held at 55° C. for 2 hours. The solid was filtered on Büchner funnel then was reintroduced in the reaction flask with 500 g of DI water and 0.45 g $NaH_2PO_4 \cdot 2H_2O + 0.12$ g $Na_2HPO_4$. After 2 hours at 55° C. The solid was filtered on Büchner funnel and dried in a vacuum oven (100 Torr) at 120° C. overnight.

Example 4: PEKK Polymer Washed with Tetrabutylammonium Hydroxide and $NaH_2PO_4 \cdot 2H_2O/Na_2HPO_4$ The same procedure as in Example 3 was followed except that the tetramethylammonium acetate was substituted for 45 mL of 0.1N solution of tetrabutylammonium hydroxide in ethanol.

Example 5: PEKK Polymer Washed with Methanol and $NaH_2PO_4 \cdot 2H_2O/Na_2HPO_4$ The same procedure as in Example 3 was followed except that only methanol was used in the first washing, with no tetramethylammonium acetate or tetrabutylammonium hydroxide.

Comparative Example 6: PEKK Polymer Washed with Phosphoric Acid

A procedure analogous to Sample 2 of German patent no. DE4207555B4, to Wilharm et al. and filed on Mar. 10, 1992, was followed in the present comparative example. In a 5000 mL 3-neck reaction flask fitted with a stirrer, a $N_2$ inlet tube, a thermocouple plunging in the reaction medium, and a condenser were introduced 50 g of polymer powder prepared according to Probe 2, 1000 mL of methanol. The mixture was held at room temperature under agitation for 1 hour, then the solid was filtered on Büchner funnel. The solid was reintroduced in the reaction flask with 1000 mL demineralized water containing 0.1 wt % of phosphoric acid ($H_3PO_4$) and held at 60° C. for 1 hour. The solid was filtered on Büchner funnel then was reintroduced in the reaction flask with 3500 mL of demineralized water for 0.5 hour at 50° C. The solid was filtered on Büchner funnel and the washing with 3500 mL DM water at 50° C. was repeated 5 more times. The final solid was dried in a vacuum oven (100 Torr) at 120° C. overnight.

Results are shown below in Table 1:

TABLE 1

| | PEKK Polymer | | | | | |
|---|---|---|---|---|---|---|
| Example | CE1 | CE2 | E3 | CE6 | E4 | E5 |
| [Al] (ppm) | 69 | 72 | 72 | 84 | 76 | 54 |
| [Na] (ppm) | 375 | 345 | 440 | 280 | 426 | 300 |
| [Fe] (ppm) | 14.3 | 13.4 | 13.2 | 15 | 16.1 | 9.8 |
| [P] (ppm) | 224 | 201 | 356 | 199 | 337 | 240 |
| Tg (° C.) | 156 | 156 | 155 | 156 | 156 | 156 |
| Tm (° C.) | 340 | 342 | 342 | 341 | 342 | 342 |
| Tc (° C.) | 279 | 279 | 281 | 278 | 281 | 280 |
| Residual acidity (μeq/g) | 26 | 4 | 4 | 18 | 6 | 4 |
| Residual basicity (μeq/g) | −21 | −20 | −24 | 0 | −27 | −27 |
| Thermal Stability (Td 2%) (° C.) | 449 | 499 | 499 | 492 | 506 | 500 |
| Complex viscosity parallel plates (10 minutes) (Pa − s) | 210 | 304 | 186 | 196 | 159 | 173 |
| G' (10 minutes) (Pa) | 817 | 1306 | 376 | 741 | 388 | 298 |
| G" (10 minutes) (Pa) | 1929 | 2746 | 1543 | 1815 | 1815 | 1709 |
| Complex viscosity parallel plates (120 minutes) (Pa − s) | 1309 | 7186 | 544 | 1148 | 452 | 558 |
| G' (120 minutes) (Pa) | 10739 | 69310 | 2985 | 9141 | 3546 | 3851 |
| G" (120 minutes) (Pa) | 7489 | 18958 | 3392 | 6952 | 4124 | 4039 |
| Viscosity ratio 120/10 parallel plates | 6.2 | 23.6 | 2.9 | 5.9 | 2.8 | 3.2 |
| Time to crossover G'-G" (minutes) | 53 | 28 | >120 | 65 | >120 | >120 |

As described above:

Comparative Example 1 illustrates unneutralized PEKK impregnated with $NaH_2PO_4$ $2H_2O$ and $Na_2HPO_4$ and exhibiting a high residual acidity of 26 eq/g; Comparative Example 2 illustrates unneutralized PEKK dry blended with magnesium oxide, with a high residual basicity of (−21);

Example 3 illustrates neutralized PEKK washed with tetramethylammonium acetate and a buffer solution of $NaH_2PO_4$ $2H_2O$ and $Na_2HPO_4$;

Example 4 illustrates neutralized PEKK washed with tetrabutylammonium hydroxide and a buffer solution of $NaH_2PO_4$ $2H_2O$ and $Na_2HPO_4$; and Example 5 illustrates neutralized PEKK washed with methanol (not affecting acidity/basicity) and a buffer solution of $NaH_2PO_4$ $2H_2O$ and $Na_2HPO_4$.

Comparative Example 6 illustrates that washing with phosphoric acid yields a polymer of high residual acidity, lacking the melt stability required for the application.

In addition, the neutralized PEKKs of the Examples unexpectedly exhibited significantly greater melt stability than did the unneutralized PEKKs of the Comparative Examples as shown by their low 120/10 complex viscosity ratios. In this regard, the viscosity profile over time by parallel plates (FIG. 1) shows the unexpectedly enhanced melt stability of PEKK from Example 3 (neutralized by washing with base) and PEKK from Comparative Example 1 (unneutralized but impregnated with phosphate salt).

Finally, the time at which the G' and G" moduli intersect (crossover time), i.e. the time it takes at this temperature for the polymer to start behaving more like solid than a liquid, is also shown in Table 1 above and indicates that the PEKK according to the invention surprisingly does not crosslink under the test conditions (crossover time >120), as opposed to the PEKK of the comparative examples.

Should the disclosure of any patents, patent applications, and publications which are incorporated herein by reference conflict with the description of the present application to the extent that it may render a term unclear, the present description shall take precedence.

The invention claimed is:

1. A method of increasing the melt stability of an unneutralized poly(ether ketone ketone) (PEKK) polymer powder comprising:
    washing the unneutralized poly(ether ketone ketone) (PEKK) polymer powder with a solution including an acid or base to form a neutralized PEKK polymer,
    wherein the unneutralized PEKK polymer has a residual acidity of greater than 10 μeq/g or a residual basicity greater than −24 μeq/g; and
    wherein,
    the acid is selected from the group consisting of acetic acid, mono alkali metal citrates, alkali or alkaline earth metal dihydrogenphosphates, and combinations thereof,
    the base is selected from the group consisting of organic amines, tetraalkylammonium hydroxides, tetraalkylammonium acetates, tetraalkylphosphonium hydroxides, tetraalkylphosphonium acetates, alkali or alkaline earth metal hydroxides, alkali or alkaline earth metal monohydrogenphosphates, alkali or alkaline earth metal phosphates, and combinations thereof; and
    if the residual acidity is greater than 10 μeq/g, the solution includes the base and the washing reduces the residual acidity of the unneutralized PEKK polymer to less than or equal to 10 μeq/g;
    if the residual basicity is greater than −24 μeq/g, the solution includes the acid and the washing reduces the residual basicity of the unneutralized PEKK polymer to less than or equal to −24 μeq/g.

2. The method of claim 1, wherein the neutralized poly (ether ketone ketone) comprises at least one recurring unit ($R^M_{PEKK}$) and at least one recurring unit ($R^P_{PEKK}$),
    wherein:
    each recurring unit ($R^M_{PEKK}$) is represented by formula:

$$-[-M_m-O-]-, \quad (1), \text{ and}$$

each recurring unit ($R^P_{PEKK}$) is represented by formula:

$$-[-M_p-O-]-, \quad (2)$$

wherein:

$M_m$ and $M_p$ are represented by the following formulae, respectively:

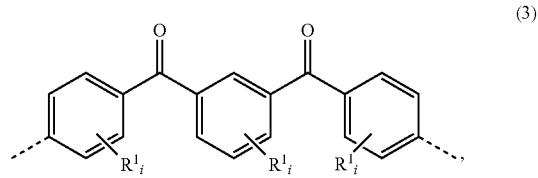

(3)

and

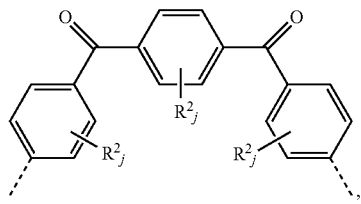

(4)

and
wherein:
each $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and each i and j, at each instance, is an independently selected integers ranging from 0 to 4.

3. The method of claim 1, wherein the amount of the acid or base is proportional, respectively, to a residual basicity or residual acidity to be neutralized, wherein the residual acidity is determined by the or Residual Acidity Test and the residual basicity is determined by the Residual Basicity Test.

4. The method of claim 1, wherein the unneutralized poly(ether ketone ketone) (PEKK) has a T/I ratio ranging from 55/45 to 75/25.

5. A composite comprising:
a polymer matrix including the neutralized poly(ether ketone ketone) (PEKK) polymer made according to claim 1, and
reinforcing fibers.

6. A composite comprising reinforcing fibers in a polymer matrix,
wherein the polymer matrix comprises a poly(ether ketone ketone) (PEKK) including at least one recurring unit ($R^M_{PEKK}$) and at least one recurring unit ($R^P_{PEKK}$), wherein:
each recurring unit ($R^M_{PEKK}$) is represented by formula:

-[-$M_m$-O—]-, (1), and each recurring unit ($R^M_{PEKK}$) is represented by formula:

-[-$M_p$-O—]-, (2)

wherein:
$M_m$ and $M_p$ are represented by the following formulae, respectively:

(3)

and

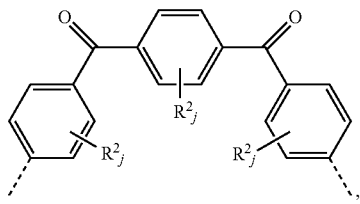

(4)

and
wherein:
each $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and each i and j, at each instance, is an independently selected integers ranging from 0 to 4;
further wherein:
the poly(ether ketone ketone) (PEKK) includes greater than 30 wt·ppm of aluminum and greater than 200 wt·ppm of phosphorus as determined by ICP-OES, and
the poly(ether ketone ketone) (PEKK) has a thermal stability (Td 2%) of at least 495° C. as measured by thermal gravimetric analysis according to ASTM D3850 from 30° C. to 800° C. under nitrogen (60 mL/min) at 10° C./minute.

7. The composite of claim 5, wherein the reinforcing fibers are continuous and comprise carbon fibers, graphite fibers, glass fibers, such as E glass fibers, ceramic fibers, such as silicon carbide fibers, synthetic polymer fibers, such as aromatic polyamide fibers, polyimide fibers and polybenzoxazole fibers, or a combination thereof.

8. The composite of claim 7, wherein the reinforcing fibers comprise carbon fibers, glass fibers, or a combination thereof.

9. The composite of claim 8, wherein the reinforcing fibers are carbon fibers exhibiting a tensile strength of greater than or equal to 3.5 GigaPascals ("GPa") and a tensile modulus of greater than or equal to 200 GPa, as measured by ASTM D638.

10. A composite article comprising the composite of claim 5.

11. The composite article of claim 10, wherein the composite article includes at least one portion having a thickness of at least 4 mm.

12. The composite article of claim 10, wherein the composite includes at least one portion having a thickness of greater than 5 mm, and wherein all portions of the composite article having a thickness of greater than 5 mm also include a void volume of less than 2%, wherein void volume is determined by x-ray microtomography.

* * * * *